W. B. KEIGHLEY.
FEEDING DEVICE FOR INSEAM TRIMMERS.
APPLICATION FILED NOV. 5, 1910.
1,020,910.
Patented Mar. 19, 1912.
2 SHEETS—SHEET 1.
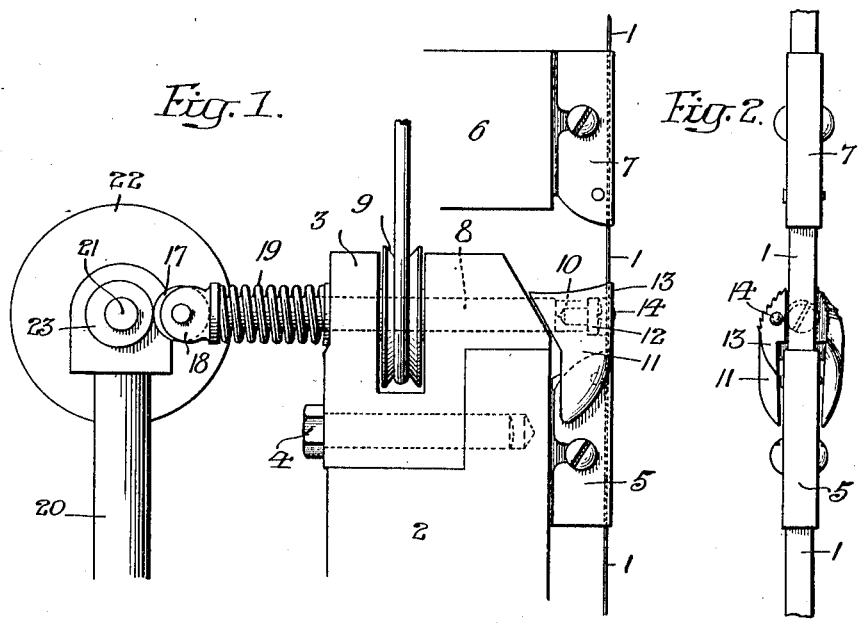
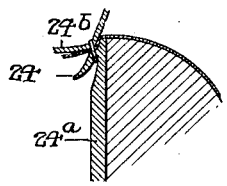
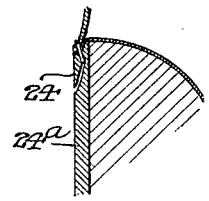
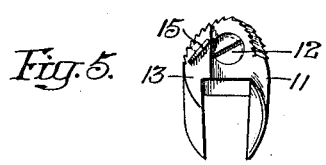
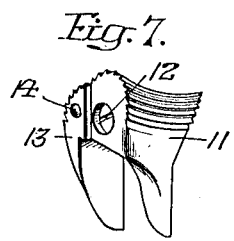
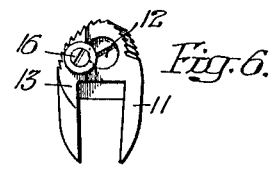
Witnesses,
Inventor,
William B. Keighley
by his Attorneys, W. B. KEIGHLEY.
FEEDING DEVICE FOR INSEAM TRIMMERS.
APPLICATION FILED NOV. 5, 1910.
1,020,910.
Patented Mar. 19, 1912.
2 SHEETS—SHEET 2.
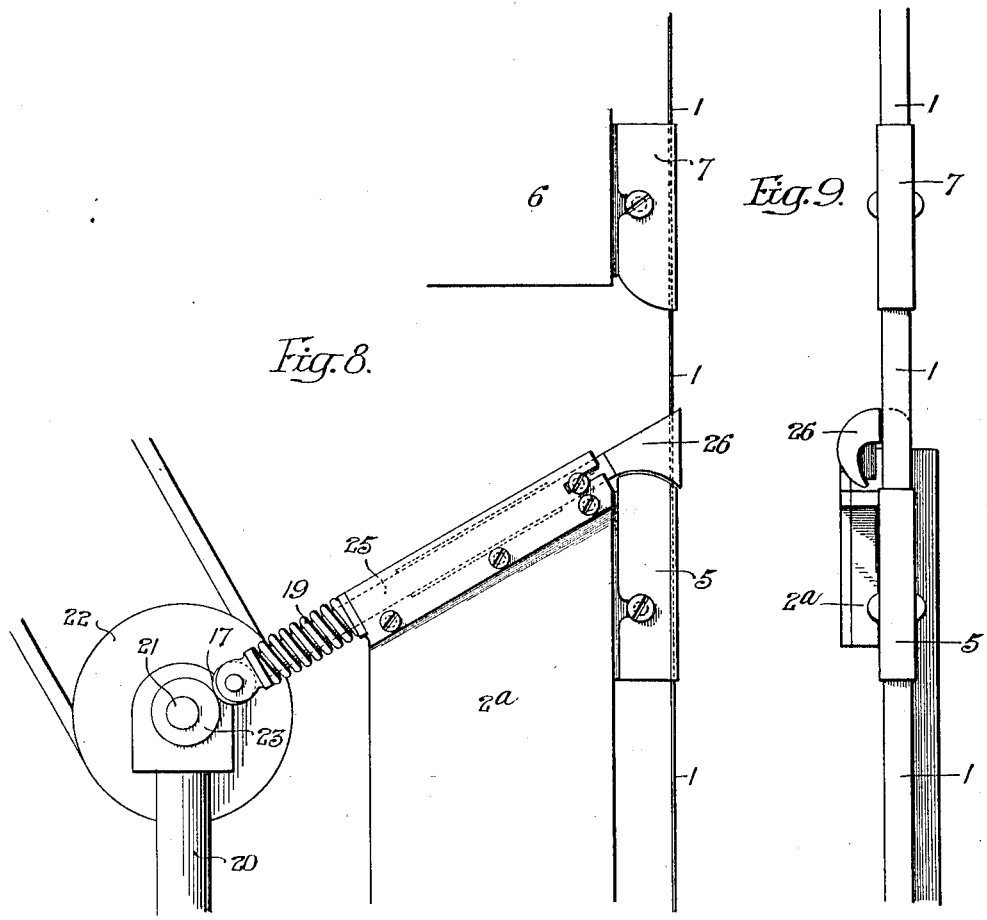
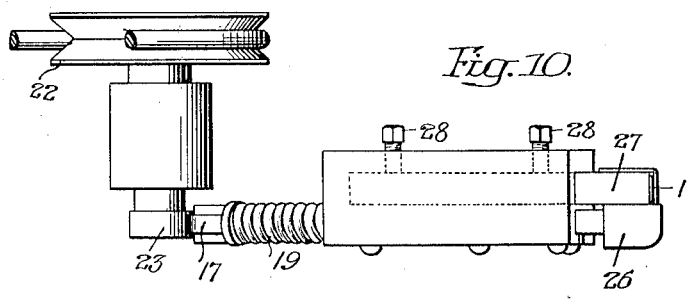

UNITED STATES PATENT OFFICE.

WILLIAM BOTTOMLEY KEIGHLEY, OF VINELAND, NEW JERSEY, ASSIGNOR TO THE KEIGHLEY COMPANY, OF VINELAND, NEW JERSEY, A CORPORATION OF NEW JERSEY.

FEEDING DEVICE FOR INSEAM-TRIMMERS.

1,020,910. Specification of Letters Patent. Patented Mar. 19, 1912.

Application filed November 5, 1910. Serial No. 590,888.

*To all whom it may concern:*

Be it known that I, WILLIAM B. KEIGHLEY, a citizen of the United States, and a resident of Vineland, Cumberland county, New Jersey, have invented certain Improvements in Feeding Devices for Inseam-Trimmers, of which the following is a specification.

One object of my invention is to provide a novel combination of apparatus for efficiently feeding to a band knife or other cutting agency a partially finished shoe whose inseam, welt, etc., are to be trimmed. Another object of the invention is to provide a feeding device for an inseam trimmer which in addition to moving a shoe toward the trimming knife, shall simultaneously act to flatten the channel edge. I further desire to provide a feeding device for a band knife trimmer which shall serve to protect the work from being accidentally engaged with the knife and which shall include means for facilitating the passage over it of the object which it is feeding to the knife.

Another object of the invention is to provide a feeding attachment for a band knife which shall be moved in two planes at right angles to each other for the purpose of simultaneously hammering or flattening a part of the work engaged by it, as well as feeding the same to the cutter.

These objects and other advantageous ends I secure as hereinafter set forth, reference being had to the accompanying drawings, in which:—

Figure 1, is a side elevation of a portion of a band knife inseam trimmer illustrating my invention as applied thereto; Fig. 2, is a front elevation of the apparatus shown in Fig. 1; Figs. 3 and 4 are fragmentary sections of a partially made shoe illustrating the operation of my device; Figs. 5 and 6 are front elevations of the work supporting piece forming part of my invention and showing two devices for diminishing the friction between said piece and the body resting thereon; Fig. 7 is a perspective view of the work supporting piece, and Figs. 8, 9, and 10 are respectively side and front elevations and a plan of a modified form of my invention.

In the above drawings 1 represents a band knife supported and actuated in any manner suitable for the work to be performed such, for example, as shown in the patent to Keighley *et al.* No. 928,133, dated July 13, 1909.

In Figs. 1 and 2 this band knife is shown as provided with a supporting post 2 on which is adjustably mounted a bearing block 3 movable toward and from the knife and held in any adjusted position by means of a screw 4. The front portion of the post 2 extends immediately adjacent the knife 1 and carries a plate guard 5 extending around and covering said knife. Above the block 3 is an arm 6 also extending adjacent the knife 1 and likewise having a guard plate 7 extending around the said knife so as to effectually cover the upper portion thereof except for a short length immediately above the guard 5. In the block 3 is journaled a shaft or spindle 8 to which is fixed a pulley 9 driven under operating conditions at a high rate of speed from a suitable source of power. The forward end of this spindle is provided with an eccentric portion indicated in dotted lines at 10 and on this is loosely mounted a structure 11 which I shall refer to as a work supporting piece. This, besides its body, has two downwardly extending branches designed to fit on opposite sides of the guard plate 5 and is so formed that the upper portion of its rear face is preferably inclined to lie either immediately adjacent to or upon the inclined front face of the block 3. Said work supporting piece is held loosely on the eccentric part of the spindle 8 by means of a screw 12 so that as said spindle is turned said work supporting piece is given a motion of bodily revolution around the axis of said spindle, under the action of the eccentric 10. It will be noted that the said work supporting piece is slightly concaved at its top surface and the upper parts of its sides; it being provided with a toothed or ribbed construction, as shown, which under operating conditions serves to aid in feeding any material resting upon it toward the knife 1. Moreover it will be noted that one side 13 of the front of the work supporting piece extends slightly beyond the cutting edge of the knife so as to form a guard for the same as well as a projecting abutment or hammer for a purpose hereafter noted. In order to facilitate the passage of material over this surface 13 and over the work supporting piece as a whole, I preferably mount in or upon it some form of friction reducing device such for example as the ball 14 shown in Fig. 1, an edgewise set wheel 15 as shown in Fig. 5, or a rotary disk 16 substantially parallel with the face of the part 13 as shown in Fig. 6.

The rear end of the spindle 8 carries a roller 17 mounted in a head 18, between which and the rear face of the block 3 there is confined a spring 19 designed to normally hold the work supporting piece toward the block 3. Mounted in any suitable manner on the supporting frame to the rear of the post 2 is a second post 20 whose upper end provides a bearing for a short shaft 21. This is provided with a pulley 22 driven from any suitable source of power and also has fixed to it a cam 23 designed to engage the roller 17 so as to impart a longitudinal movement in one direction to the shaft 8; the movement to said shaft in the opposite direction being caused by the spring 19.

While I do not confine myself to any particular proportions for the above described parts, I have found that good results may be obtained by giving the cam 23 a maximum eccentricity of 1/64 of an inch and the eccentric 10 an eccentricity of 1/32 of an inch.

A partially finished shoe before being trimmed has the channel edge 24 of its insole 24$^a$ elevated as shown in Fig. 3 and surplus portions of the upper and welt likewise projecting outwardly as indicated at 24$^b$. If such a shoe be presented to the knife it is held in such position that the channel edge of its insole is immediately adjacent the face of the work supporting piece, while the projecting parts of its welt, upper, etc., rest upon and are guided by the latter.

If the pulleys 9 and 22 be driven, the work supporting piece is so moved by the eccentric 10 as to intermittently feed or tend to feed the shoe toward the cutting edge of the knife, while at the same time the spindle 8 is given a rapid longitudinal reciprocating motion so that the work supporting piece is caused to strike a succession of blows upon the projecting channel edge 24 held up against it, so that this is flattened into the position shown in Fig. 4. At the same time the band knife severs the surplus welt, upper, etc., the pieces of which, as well as dust, etc., are prevented by the work supporting piece from being caught between the cutting blade and its associated parts; said piece also preventing to a greater or less extent the admission of dust, waste or the like into the spindle bearing.

In the modified form of my invention shown in Figs. 8 to 10 inclusive I have omitted the means for causing the work supporting piece to alternately approach and recede from the band knife. In this case, therefore, the spindle 8 is replaced by a bar 25 of rectangular section slidably mounted in the top of a supporting post 2$^a$ at an angle of about 60° to the general line of the knife.

As in the case of the spindle 8 there is provided a post 20 with a shaft 21, a driving pulley 22 and a cam 23 and the latter of these co-acts with a roller 17 on the end of the bar 25 to move them in one direction when the pulley 22 is turned. A spring 19 serves to move said bars in the opposite direction. In this case, however, the work supporting member 26 extends only on the front side of the knife 1, though as before it projects beyond the plane of the knife to form a hammer or beater and is removably held to the core 25. A second bar 27, also removably and adjustably held in the top of the post 2$^a$, extends substantially parallel with the bar 25 and its forward end lies immediately adjacent one face of the knife 1 as in the patent heretofore referred to; it being held in any given position by screws 28. In this form of the invention the work supporting piece or member 26 under operating conditions is rapidly vibrated or caused to tremble so that it not only serves to beat or flatten the channel edge of the insole of a partially finished shoe as the latter is fed toward the knife 1, but by reason of the fact that it is rapidly moved or shaken, greatly facilitates the passage of such shoe over its surface. Such surface may or may not be provided with teeth or roughened portions as found advisable for the work to be performed.

I claim:—

1. The combination in an inseam trimming machine of a cutter; a work support therefor on one side of said cutter and extending across the plane of the same so as to form a beater adjacent the cutter; with means for vibrating said work support.

2. The combination of a cutter; a supporting structure; a longitudinally movable bar mounted therein; an independently movable work-supporting head on said bar projecting adjacent the cutter and across the plane thereof; means for vibrating said bar; and means for moving said head to feed the work to said knife.

3. The combination in an inseam trimmer of cutting means; and a device including an eccentric, and a combined work feeding and work beating head thereon for simultaneously feeding a shoe toward said cutting means and flattening the channel edge thereof.

4. The combination in an inseam trimmer of cutting means; a work supporting structure mounted to coöperate therewith; and means for imparting to said structure movement in two planes at right angles to each other.

5. The combination in an inseam trimmer of a band knife and a work support therefor; with means for causing said work support to move bodily in a circular path so as to feed material to the knife.

6. The combination with a band knife of a work support therefor having the form of a channel edge beater; and means for vibrating said support in a line substantially at right angles to the plane of the knife blade.

7. The combination in an inseam trimmer of a cutter; a work engaging structure adjacent thereto; with mechanism for causing said structure to move bodily in a circular path and simultaneously to move in a line substantially at right angles to the plane of said path.

8. The combination with a band knife of a rotary spindle; a work supporting piece actuated by said spindle to move bodily in a circular path; and means for longitudinally moving said spindle while it is turning to reciprocate said work supporting piece.

9. The combination with a band knife, of a work support mounted adjacent thereto and having a face lying substantially parallel to the plane of said knife; there being an extension to said support projecting into the plane of the knife; and an anti-friction member mounted on the extension of said work support for facilitating the passage of work toward the knife.

10. The combination with a band knife of a work supporting piece having a face substantially parallel with the knife and a projection extending beyond and in front of the cutting edge thereof; with means for moving said piece to feed work to the knife.

11. The combination with a band knife of a supporting post; a block mounted thereon; a spindle rotatably carried by said block and having an eccentric portion; means for turning the spindle; means for vibrating the spindle longitudinally; and a work supporting piece mounted on the eccentric portion of the spindle adjacent the knife.

12. The combination with a band knife of a supporting post; a block mounted thereon; a spindle rotatably carried by said block and having an eccentric portion; means for driving the spindle; means for vibrating the spindle longitudinally; and a work supporting piece mounted on the eccentric portion of the spindle adjacent the knife; with means for adjusting the block upon the post to compensate for wear of the knife.

13. The combination with a band knife of a supporting post; a spindle carried by said post and having an eccentric portion; means for turning the spindle; with a forked work supporting piece mounted on the eccentric portion of the spindle and having its branches extending on opposite sides of an extension of the post.

14. The combination with a band knife of a supporting post; a spindle carried by said post and having an eccentric portion; means for turning the spindle; a forked work supporting piece mounted on the eccentric portion of the spindle and having its branches extending on opposite sides of an extension of the post; with means for longitudinally vibrating the spindle.

15. The combination with a band knife of a supporting post; a longitudinally movable member mounted thereon; means for longitudinally reciprocating said member; with a work supporting piece mounted on the member adjacent the knife and having a portion projecting beyond the cutting edge thereof to serve as a hammer for flattening the channel edge of a shoe acted on by the knife.

16. The combination with a band knife of a supporting post; a longitudinally movable member mounted thereon; means for longitudinally reciprocating said member; a work supporting piece mounted on the member adjacent the knife and having a portion projecting beyond the cutting edge thereof to serve as a hammer for flattening the channel edge of a shoe acted on by the knife; with mechanism for causing a portion of said work supporting piece to alternately approach and recede from the cutting edge of the knife.

17. The combination with a band knife, of a supporting piece mounted adjacent the same and having a roughened top surface; with mechanism for causing said piece to bodily describe a circular path so that a portion thereof alternately approaches and recedes from the cutting edge of the knife.

In testimony whereof, I have signed my name to this specification, in the presence of two subscribing witnesses.

WILLIAM BOTTOMLEY KEIGHLEY.

Witnesses:
HARRY C. DOWN,
WILLIAM E. HUGHES.

---

Copies of this patent may be obtained for five cents each, by addressing the "Commissioner of Patents, Washington, D. C."